April 21, 1959 — H. B. FUGE — 2,883,611
MOBILE POWER SYSTEMS
Filed Dec. 3, 1954 — 2 Sheets-Sheet 1

INVENTOR
Harry B. Fuge
BY
ATTORNEY

United States Patent Office 2,883,611
Patented Apr. 21, 1959

2,883,611

MOBILE POWER SYSTEMS

Harry B. Fuge, Somerville, N.J., assignor to The Singer Manufacturing Company, Elizabeth, N.J., a corporation of New Jersey Application December 3, 1954, Serial No. 472,859

8 Claims. (Cl. 322—40)

This invention relates to a control system for an electromagnetic clutch and to an electric power generating system. The invention also relates to a mobile refrigeration system adapted for use in motor vehicles.

The widespread use of frozen food products and other perishables requiring refrigeration requires some form of refrigerated carrier in order to transport the products safely and economically fom one point to another. A large part of such transportation is done by truck or railroad car, the cargo space of which must be cooled in some manner. It will be appreciated that space available for a cooling unit is a minimum and that, in spite of being compact, the cooling unit must be dependable and of relatively large cooling capacity. During shipment, it is not uncommon for a truck or freight car to stand idle in a terminal for a considerable period of time. Thus, it is desirable that the cooling unit can be readily operated from some conventional source of power available at a terminal.

Having the above and other problems in view, it is an object of this invention to provide a compact and reliable mobile refrigeration system.

Another object of the invention is to provide a mobile refrigeration system which can be operated either while the transporting vehicle is in motion or stopped at a terminal source of power.

A further object of the invention is to provide a simple and reliable control system for the unit.

In the drawings, Fig. 1 is a diagrammatic representation of one embodiment of the refrigeration system of this invention.

Figure 1:
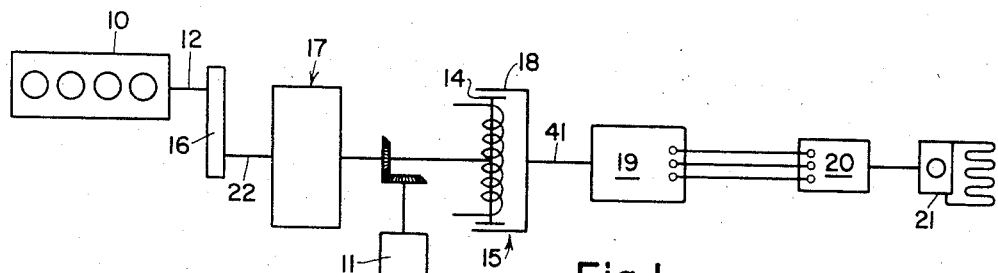

Referring more particularly to the drawings, a prime mover 10 is shown in Fig. 1, which may be the gasoline or diesel engine of a truck. Of course, it will be appreciated that the prime mover 10 might be some other power source such as the rotatable axle of a railway car or an auxiliary engine. A direct current generator 11 is connected to the driven shaft 12 of the prime mover 10 to be driven thereby through suitable power transmission devices, to be described, whenever the shaft 12 rotates. The prime mover driven shaft 12 also drives the driving element 14 of an electromagnetic slip clutch 15 through a suitable power transmission device 16 and a change speed gear unit 17. The clutch is provided with a driven element 18 which drives an alternator 19. The alternator 19 is directly electrically connected to an A.C. motor 20. The motor 20 drives a constant load device 21 which in this embodiment is shown as a refrigeration unit. It will be appreciated that this entire system can be mounted on a conventional truck or train car chassis wherein the refrigeration unit 21 is used to cool the interior of the cargo body.

Figure 2:
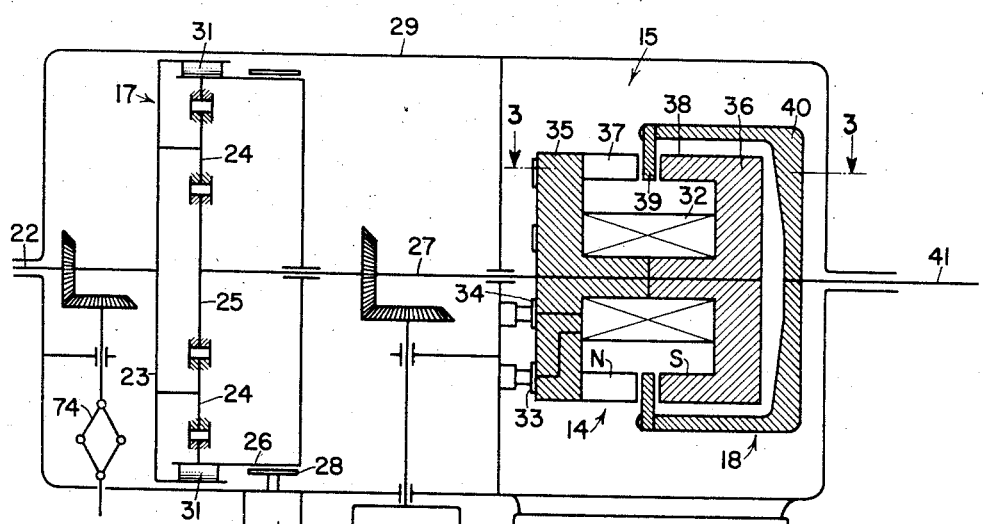
Fig. 2 is a diagrammatic representation of a speed change gear unit and electromagnetic clutch embodied in the refrigeration system.

The details of the change speed gear unit 17 and the electromagnetic clutch 15 are shown diagrammatically in Fig. 2. The change speed gear unit 17 is an overdrive unit of the planetary type provided with an input shaft 22 secured to a planet carrier 23. The planet carrier 23 rotatably supports planet pinions 24 which mesh with a sun gear 25 and an orbit gear 26. The sun gear 25 is secured to an output shaft 27 which is also the input shaft of the electromagnetic clutch 15. A solenoid actuated brake 28 carried by a housing 29 is arranged to engage the orbit gear 26 upon energization of a solenoid 30. The brake 28 holds the orbit gear 26 stationary to obtain an overdrive ratio through the gear unit. In the present embodiment, the gearing is designed to produce three revolutions of the output shaft 27 for each revolution of the input shaft 22 when the orbit gear 26 is braked. When the brake 28 is released, the orbit gear 26 tends to rotate faster than the carrier 23, but an overrunning clutch 31 disposed between the orbit gear 26 and the planet carrier 23 functions to clutch the orbit gear 26 to the carrier 23 for locked unit operation of the gearing resulting in a 1:1 transmission ratio through the gear unit 17. In the present embodiment, the gear unit input shaft 22 is rotated at the same speed as the prime mover driven shaft 12. Therefore, the clutch input shaft 27 can be rotated at the same speed as the driven shaft 12 when the brake 28 is released or at three times the speed of the driven shaft 12 when the brake 28 is engaged. The gearing unit is not essential but it has been found to improve the operating efficiency of the system over a wide range of prime mover speeds. It should be noted that in the preferred embodiment the D.C. generator 11 is driven by the output shaft 27 of the gear unit 17.

Figure 3:
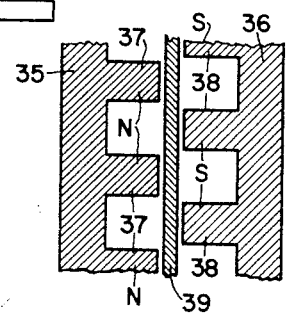
Fig. 3 is a sectional view of the clutch unit taken substantially on line 3—3 of Fig. 2.
Figure 4:
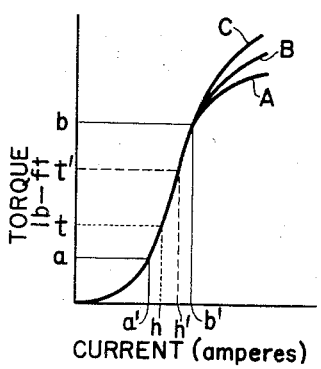
Fig. 4 is a curve showing the torque transmitted by the clutch for various excitation current values.

The clutch unit 15 may be an electromagnetic slip coupling of the hysteresis type, similar to that shown in U.S. Patent No. 2,571,762, as distinguished from other magnetic clutches, such as eddy current clutches. The input shaft 27 of the clutch 15 carries the driving element 14 comprising an exciting winding 32 which is connected through slip rings 33 and 34 to a source of excitation, to be described. The winding 32 is capable of producing magnetic flux in soft iron members 35 and 36 carried by the shaft 27. The member 35 carries a series of circumferentially spaced pole pieces 37 while the member 36 carries a series of opposed circumferentially spaced pole pieces 38 spaced axially from the pole pieces 37 as shown in Fig. 3. A ring 39 of permanent magnet material having a high hysteresis loss is disposed between the pole pieces 37 and 38 and is fastened to a carrier 40 forming the driven element 18 which is secured to the clutch output shaft 41. It is characteristic of this type of clutch that the driving element and driven element can rotate in unison and transmit torque without relative slip. Within prescribed limits, the clutch will also transmit a fixed torque for a given excitation regardless of the amount of slip occurring in the clutch. In Fig. 4, values of torque transmitted by the clutch have been plotted against the current required to excite the clutch at various values of slip in the clutch. Curve A represents a condition where the driving and driven elements of the clutch rotate at the same speed with no slip. Curve B represents 500 r.p.m. slip in the clutch, i.e., the clutch driving element rotates 500 r.p.m. faster than the driven element. Curve C represents 1500 r.p.m. slip in the clutch. The major portions of the curves are substantially identical and they have been so shown. It is only at very high excitation that the curves differ. Between torque values *a* and *b* where the curves are substantially identical, the slope of the curve is quite steep and a change in the torque value transmitted by the clutch requires only a change in the exciting current from *a'* to *b'*. Thus a very small change in exciting current produces a wide range of torque transmission of the clutch. The importance of this feature will be more apparent below. If desired, the exciting winding may be placed on the driven shaft 41 and the ring 39 on the driving shaft.

Figure 6:
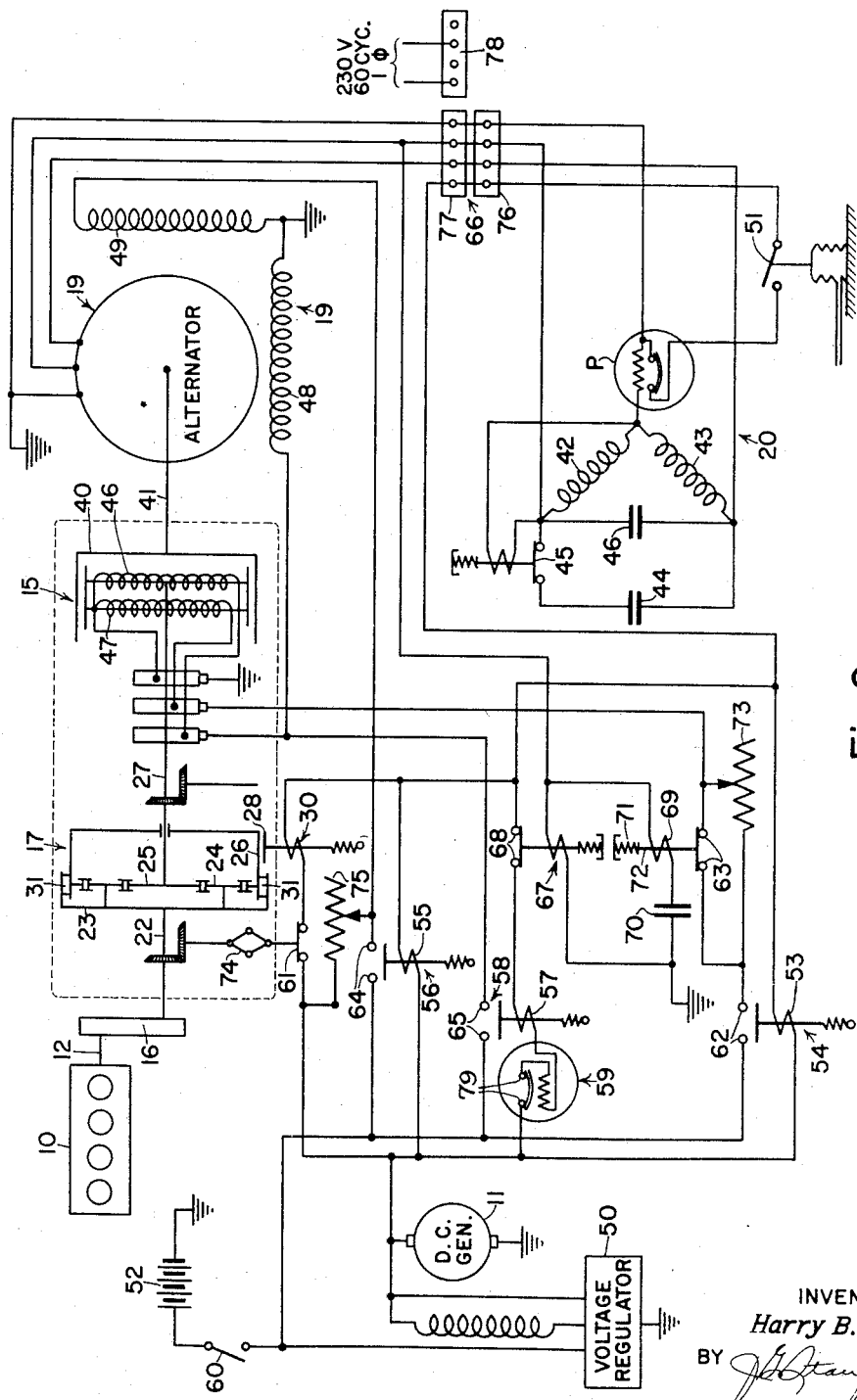
Fig. 6 is a circuit diagram and diagrammatic showing of the refrigeration system.

The control system and electrical circuitry are most clearly understood with reference to Fig. 6. The electric motor 20 for driving the refrigeration unit is shown as a single phase capacitor type induction motor of a well known type provided with a main field winding 42 and an auxiliary field winding 43. In this embodiment the motor 20 is designed to operate from a conventional 230 volt, single phase, 60 cycle power line but it is understood that the system can be adapted to motors operated by other voltages and frequencies. A starting capacitor 44 is arranged to be disconnected after starting by a switch 45 in a conventional manner while a conventional phase-splitting capacitor 46 remains in the circuit. It should be remembered that the motor 20 is directly connected to the refrigeration unit 21 and therefore must be started under full load. Such conditions require a high starting current and hence a relatively large power supply which in this case is the alternator 19 but space limitations make it undesirable to use a single phase alternator large enough to supply the required starting current. However, it has been found that a two phase alternator 19 of much smaller physical size can be used to obtain the required current. While many types of alternators can be used, the preferred embodiment is a four pole alternator of a conventional type with the main motor winding 42 connected across one phase of the alternator and the auxiliary winding 43 connected across the other phase. Thus, the single-phase motor 20 operates as a two phase motor when connected to the two phase alternator 19. In most single-phase induction motors of the capacitor type such as may be used here for driving the refrigerating compressor, the main and auxiliary windings are not alike electrically, as would be the case with two-phase motors, but are wound for different voltages. It is to be understood that, in such cases, the alternator armature windings are purposely made different and are designed to match the voltages required by the motor windings, but this in no way alters the basic operation of the system. This provides the relatively high starting torque per unit current of a two-phase motor, thus permitting the use of a smaller two-phase alternator 19, but still provides a single phase motor 20, which can be used on a single-phase power line when it is available. An overload protective device P is placed in the motor circuit.

The D.C. generator 11 is used to provide excitation to the control system and to a battery 52. A conventional automobile type of voltage regulator 50 containing a reverse current cutout and current and voltage limiting relays maintains the generator voltage substantially constant after a predetermined minimum speed of the prime mover shaft 12 is attained. A conventional pressure type switch 51 is connected to the refrigeration unit 21 and functions as the master control in calling for refrigeration and operation of the system.

It is believed that the operation of the system will now be readily understood with particular reference to Fig. 6. Assuming that the prime mover 10 is at rest but the main switch 60 is closed and the switch 51 closes calling for operation of the system, nothing can happen, since the generator 11 is not operating to supply excitation to the control system. While the battery 52 is prepared to supply the excitation, the voltage regulator 50 prevents this. Thus, there can be no drain on the battery 52 when the prime mover shaft 12 is not rotating. If the prime mover shaft 12 is now rotated and comes up to some minimum speed, for example 400 r.p.m. which may be the idling speed of a truck engine, the D.C. generator 11 begins to operate. As the speed of shaft 12 picks up from 0 to 400 r.p.m., the generator driven through the locked gear unit 17 gradually increases its output until at some predetermined speed, for example 125 r.p.m., the generator 11 delivers enough output to actuate the brake solenoid 30, engaging the brake 28 with the orbit gear 26. At this point, the speed change unit 17 is effective to drive the shaft 27 at three times the speed of the shaft 12 or 375 r.p.m., rapidly increasing the generator output. During this period, nothing can happen even though the switch 51 closes since the generator does not supply sufficient excitation to the control system to operate the relays.

When the prime mover shaft 12 reaches a predetermined speed, such as the 400 r.p.m. idle speed, the generator 11 is rotating at 1200 r.p.m., which is sufficient to supply excitation to the control system. If refrigeration is required, the pressure actuated switch 51 closes completing circuits from the generator 11 through the coil 53 of a clutch relay 54 and through the coil 55 of an alternator relay 56. Another circuit is completed through the coil 57 of a starting relay 58 and through a thermal time delay relay 59. Energization of the relay coil 53 closes contacts 62 and supplies current from the battery 52 to a clutch running winding 47 through normally closed contacts 63. At the same time, contacts 64 are closed by the energization of relay coil 55 permitting current to flow from the battery 52 to an alternator running winding 49. Since the starting relay coil 57 is also energized, the contacts 65 close and current flows from the battery 52 to a clutch starting winding 46 and an alternator starting winding 48 causing the clutch 15 to transmit power at a 1:1 speed ratio under full excitation. However, with the brake 28 engaged, the gear unit 17 provides an overdrive, thus the clutch 15 and the alternator 19, as well as the generator 11, are driven at three times the speed of the prime mover shaft 12 or 1200 r.p.m. This causes the alternator 19 to generate power at about a 40 cycle frequency which has been found to be sufficient to start the motor 20 and drive the refrigeration unit 21. It should be noted that the alternator 19 is directly connected to the motor 20 through a detachable four-pin plug and receptacle 66. No switching occurs between the alternator 19 and the motor 20 during operation. This connection of the motor 20 to the alternator 19 without switching has been termed a "direct connection." As the alternator picks up speed from standstill, the generated voltage and frequency build up. This voltage actuates a normally-closed voltage responsive relay 67 to open the contacts 68 in the circuit for the starting relay coil 57, thus causing the contacts 65 to open and break the circuit to the alternator and clutch starting windings 48 and 46, respectively. After the starting windings are de-energized, the system is in normal running operation and will continue to run until sufficient refrigeration has been supplied, causing the switch 51 to open and de-energize the control system.

It will be appreciated that the power demand on the system for starting the compressor is many times that required for running it and, to secure this high starting power, the initial excitation of both the clutch and the alternator must be correspondingly high in order to transmit sufficient torque and to generate sufficient voltage. This is accomplished in the present invention by providing a high-excitation or starting winding and a separate lower-excitation or running winding both for the clutch and for the alternator. During starting, both windings are effective in providing excitation, but after the starting period, the running winding alone is sufficient to furnish the excitation. If, for any reason, the contacts 68 of relay 67 should not open within a predetermined time after their closure, the contacts 79 of the thermal time delay relay 59 will open to remove the excitation from the clutch and alternator starting windings. This is to insure that maximum excitation is not maintained long enough to cause substantial discharge of the battery 52, which would render the system inoperative.

From the foregoing description, it will be appreciated that the system cannot function until the speed of the generator 11 is high enough to provide sufficient excitation to actuate the relays 54, 56 and 58. This prevents the battery 52 from being drained by the fields of the clutch 15 and the alternator 19 when the generator 11 cannot recharge the battery 52.

Figure 5:
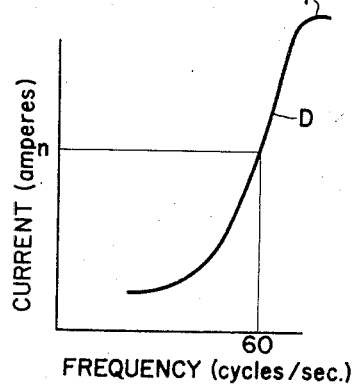
Fig. 5 is a curve showing current flow in a frequency resonant relay control circuit for various frequencies of relay exciting current.

As the speed of the prime mover shaft 12 increases, the speed of the alternator 19 also increases until, at 600 r.p.m. of the shaft 12, the alternator is rotating at 1800 r.p.m. and producing 60 cycle power, the frequency for which the motor 20 of this embodiment is designed. As the speed of the prime mover shaft 12 increases above 600 r.p.m., it is desirable that the alternator output frequency remain at 60 cycles. This is accomplished by means of a frequency resonant control circuit connected to the alternator output. In order to make the relay responsive to frequency, a relay winding 69 is placed in series circuit relation with a capacitor 70. The values of the capacity and the winding inductance are chosen so that a steep portion of the series resonance curve occurs in the region of the preferred output frequency, in this embodiment 60 cycles per second, the actual resonance peak occurring at some higher frequency. This is shown in Fig. 5 where the current through winding 69 is plotted against the frequency of the voltage supplied to the winding, also taking into account the fact that the magnitude of the voltage also increases with the frequency for constant alternator excitation. Referring to Fig. 5, the resonance curve of current flow in amperes in the relay coil 69 for various frequencies in cycles per second of alternator output is shown. The values of resistance, inductance and capacitance in the relay coil 69 and condenser 70 are chosen so that the circuit resonates at the peak P of curve D, at which point maximum current can flow in the relay coil 69. It is apparent that the curve D has its steepest slope at approximately 60 cycles at which point a current of $n$ amperes is permitted to flow in the relay coil 69. Obviously, at this point, any slight change in frequency results in a comparatively large change in the current permitted to flow through the relay coil 69. The bias spring 71 on the relay armature 72 is adjusted to hold the armature 72 and keep the contacts 63 closed until the alternator output frequency reaches 60 cycles, permitting a current of $n$ amperes to flow in the relay coil. This current of $n$ amperes causes just enough magnetic flux to move the armature 72 against the spring 71 to open the contacts 63. When the contacts 63 open, an impedance 73 is placed in the circuit for exciting the clutch running winding 47 causing the clutch excitation to decrease sufficiently for the clutch 15 to slip. If the clutch 15 slips enough that the frequency of the alternator output drops below 60 cycles, the current permitted to flow in the relay coil 69 also drops, permitting the spring 71 to move the armature and close the contacts 63, thus shorting out the impedance 73 and placing full excitation on the running winding 47. The contacts 63 are thus opened and closed by the frequency-responsive relay to maintain the speed of the alternator 19, and hence its output frequency, substantially constant. Above 600 r.p.m. of the shaft 12 up to 1300 r.p.m. the clutch is alternately fully excited or only partially excited to control the frequency of the generator output.

When the prime mover shaft 12 reaches 1300 r.p.m., the shaft 27 is rotating at 3900 r.p.m. but in order to maintain the shaft 41 at a maximum of 1800 r.p.m. and the alternator at 60 cycles output, there must be 2100 r.p.m. lost in the clutch. This means a large amount of power is lost in the clutch 15 resulting in inefficient operation. To increase the overall efficiency, the gear unit 17 is used. When the shaft 12 exceeds 1300 r.p.m. the centrifugal switch actuator 74 driven by the shaft 12 opens the contacts 61 causing the brake 28 to release and permitting the clutch 31 to engage. Thus, the speed of the gear unit driven shaft 27 and the D.C. generator 11 is reduced automatically to the same speed as the driven shaft 12, or approximately 1300 r.p.m. This corresponds to an alternator output frequency of approximately 43 cycles or substantially the same frequency as at idling speed of the shaft 12. From this point, as the speed of shaft 12 increases the alternator output frequency is controlled in precisely the same fashion as described above except that there is now a direct drive through the gear unit 17. As the speed of the shaft 12 drops, the same control is maintained except that when the speed of the shaft 12 drops to 1300 r.p.m., the overdrive gear unit 17 functions again to rotate the driving clutch element 14 at three times the speed of the shaft 12. When sufficient refrigeration has been supplied, the switch 51 is opened and the entire unit is de-energized.

Referring again to the curves of Fig. 4, the advantages of this system will now be more apparent. As shown in Fig. 4, the current change in the clutch excitation is very small to produce a large change in the amount of torque transmitted by the clutch 15. For example, the change in current, $a'-b'$, to change the torque capacity of the clutch 15 from 6 lb.-ft. to 8 lb.-ft. may be only 35 milliamperes. Such small amounts of current can be handled by direct switching at the frequency relay contacts 63 without any danger of burning contacts or arcing and permit the use of a relatively inexpensive relay to obtain very critical frequency control of the alternator output. Most other electromagnetic clutches require a change in exciting current which is far too large to handle economically by direct switching in order to obtain any appreciable change in the torque which can be transmitted by the clutch. The curves of Fig. 4 also clearly indicate that within the range of current from $a'$ to $b'$ that for any given excitation current, the clutch 15 will transmit a definite torque regardless of the amount of slip in the clutch 15. Thus, in the unit disclosed, for example, when the shaft 27 is rotating at 1900 r.p.m., the alternator shaft 41 must be limited to 1800 r.p.m. for a 60 cycle output frequency. To accomplish this, the relay contacts 63 are opened, placing the impedance 73 in the clutch running winding circuit to limit the exciting current to a predetermined reduced value of $h$ amperes. The current of $h$ amperes will excite the clutch sufficiently to transmit only a predetermined fixed torque of $t$ lb.-ft. which is less than the torque required to drive the constant load refrigeration unit, resulting in the clutch slipping until the alternator frequency output drops below 60 cycles. At 3600 r.p.m. of the shaft 27, the excitation current is still $h$ amperes and there must now be 1800 r.p.m. slip in the clutch 15 to obtain a 60 cycle alternator output but the torque transmitted by the clutch is still $t$ lb.-ft. The same relation exists for a maximum excitation of $h'$ amperes for transmitting a torque of $t'$ lb.-ft. sufficient to drive the refrigeration unit 21 at full capacity. Thus the clutch operates at all times at one of two definite torque capacities regardless of the amount of slip required between the prime mover shaft 12 and the alternator shaft 41. This permits the unit to be readily controlled by a simple control system without any complicated excitation control.

In clutches of the present type, windage and friction coupling between the driving element 14 and the driven element 18 is a problem at high speeds of the shaft 27 when the refrigeration switch 51 is open and the system is de-energized. Under these conditions, the driven element 18 drifts up to the speed of the driving element 14. If the alternator winding 49 is not excited, there is no load on the alternator armature shaft 41 and it may drift up to speeds as high as the speed of shaft 27 which may be 4000 r.p.m. or more. Such a high speed corresponds to a frequency of some 130 cycles which is far above the highest frequency at which the motor 20 will start. If the switch 51 closes at such high speeds of the alternator shaft 41, the motor will not start nor will the alternator 19 load up to brake the driven element 18 down to normal speed. To avoid this condition, an impedance 75 is placed in a circuit with the alternator running field relay contacts 64. When the pressure switch 51 and hence the relay contacts 62 are open, the impedance permits a minimum amount of excitation current to flow through the alternator running winding 49. Since the motor 20 is directly connected across the alternator at all times, it functions as a low-impedance circuit on the alternator, loading it sufficiently to prevent the alternator shaft 41 from over-speeding.

The above description describes conditions of operation when the refrigeration unit 21 is connected to the alternator 19 for operation as a mobile unit. In many instances, it is desirable that the unit 20—21 operate from a stationary power line. For example, it is often desirable to park a refrigerated truck overnight at a terminal without unloading it but it is not practical to keep the truck engine running all night. Usually a stationary power line is available and it is most advantageous if the refrigeration unit can be operated from such a power line. In the device disclosed, it is only necessary to disconnect the plug part 77 from the receptacle part 76 and connect it to the stationary receptacle part 78 which in the embodiment shown is connected to a 230 volt, 60 cycle, single-phase power line. When connected in this manner, the refrigeration unit 21 operates as a conventional unit driven by a single-phase capacitor motor 20 controlled by the pressure switch 51.

In some instances, it may be desirable to use a permanent magnet alternator, which may be similar to the alternator shown in U.S. Patent No. 2,485,474, in place of the alternator 19 having field windings 48 and 49 which must be excited. If a permanent magnet alternator is used, there is no change in the system or its operation except that the alternator windings 48 and 49, the relay 56 for the winding 49 and the impedance 75 are not required. In this type of structure, the alternator is always self excited and no other excitation is required.

It will be appreciated that the various numerical values applied to voltages, currents, and speeds in the above description are for illustration only and the device is not limited to these values. It is believed that the advantages of the device are apparent from the above description.

Having thus set forth the nature of the invention, what I claim herein is:

1. In combination, a variable speed prime mover having a driven shaft, an electromagnetic clutch having a driving element and a driven element, one of said elements comprising an annular ring of material having a high hysteresis loss and the other of said elements carrying an exciting winding, a two speed ratio gear unit having a low speed shaft and a high speed shaft, power transmission means operatively connecting said prime mover driven shaft to said gear unit low speed shaft and said clutch driving element to said gear unit high speed shaft, an alternator having a field winding and an armature winding, power transmission means operatively connecting said alternator to said clutch driven element, a constant voltage D.C. power supply for exciting said clutch exciting winding and said alternator field winding, an A.C. motor directly electrically connected to said alternator, a substantially constant torque load device adapted to be driven by said motor, control means operatively connected to said D.C. power supply and said clutch exciting winding for causing a change in the exciting current, said control means including a device for varying the excitation of said clutch exciting winding in accordance with the power supplied to said motor by said alternator, a master switch controlled by said load device for energizing said control means, and speed change means responsive to the speed of said prime mover driven shaft and said master switch for changing the speed ratio of said gear unit.

2. In combination, a variable speed prime mover having a driven shaft, an electromagnetic clutch having a driving element and a driven element, one of said elements comprising an annular ring of material having a high hysteresis loss and the other of said elements carrying an exciting winding, power transmission means operatively connecting said clutch driving element to said prime mover driven shaft, an alternator having a field winding and an armature winding, power transmission means operatively connecting said alternator to said clutch driven element, a constant voltage D.C. power supply for exciting said clutch exciting winding and said alternator field winding, an A.C. motor directly electrically connected to said alternator, a substantially constant torque load adapted to be driven by said motor, control means operatively connected to said D.C. power supply and said clutch exciting winding for causing a change in the exciting current, said control means including a device for varying the excitation of said clutch exciting winding in accordance with the power supplied to said motor by said alternator.

3. In combination, a prime mover having a driven shaft, an electromagnetic clutch having a driving element operatively connected to said prime mover driven shaft and a driven element, an exciting winding for said clutch, a two-phase alternator having an armature operatively connected to said clutch driven element, a single phase A.C. motor having main and auxiliary field windings, direct electrical connections operatively connecting said main field winding across one phase of said generator and said auxiliary field winding across the other phase of said generator, a power supply for supplying excitation to said alternator and to said clutch exciting winding, and frequency-responsive means for varying the excitation supplied to said clutch exciting winding, a single phase A.C. power supply, and means for selectively connecting said motor to said alternator and to said single phase power supply.

4. In combination, a variable speed prime mover having a driven shaft, an electromagnetic clutch having a driving element and a driven element, one of said elements comprising an annular ring of material having a high hysteresis loss and the other of said elements carrying an exciting winding, power transmission means operatively connecting said clutch driving element to said prime mover driven shaft, a two phase alternator having a field winding and an armature winding, power transmission means operatively connecting said alternator to said clutch driven element, a constant voltage D.C. power supply for exciting said clutch exciting winding and said alternator field winding, a single phase A.C. motor directly electrically connected to said two phase alternator, a substantially constant torque load adapted to be driven by said motor, control means operatively connected to said D.C. power supply and said clutch exciting winding for causing a change in the exciting current, said control means including a device for varying the excitation of said clutch exciting winding in accordance with the power supplied to said motor by said alternator.

5. In combination, a variable speed prime mover having a driven shaft, an electromagnetic clutch having a driving element and a driven element, one of said elements comprising a ring of material having a high hysteresis loss and the other of said elements carrying an exciting winding, power transmission means operatively connecting said clutch driving element to said prime mover driven shaft, a D.C. generator operatively connected to the clutch driving element, an alternator having a field and an armature winding power transmission means operatively connecting said alternator to said clutch driven element, a battery source of D.C. voltage for exciting said alternator field winding and said clutch exciting winding, and control means energized by said D.C. generator for changing the exciting current supplied to said clutch exciting winding by said battery source, said control means including a make-and-break type switch through which the change in exciting current flows and means for actuating said switch in accordance with the frequency output of said alternator armature.

6. In combination, a prime mover having a driven shaft, an electromagnetic clutch having a driving element and a driven element, one of said elements comprising an annular ring of material having a high hysteresis loss and the other of said elements carrying an exciting winding, power transmission means operatively connecting said clutch driving element to said prime mover driven shaft, an alternator having a field winding and an armature, power transmission means operatively connecting said alternator to said clutch driven element, a substantially constant voltage D.C. source for exciting said clutch exciting winding and said alternator field winding, electrical circuit connections between said D.C. source and said windings, said electrical circuit between said D.C. source and said clutch exciting winding including a make-and-break type switch and an impedance in parallel with said switch, and actuating means for said switch, said actuating means being responsive to the output frequency of said alternator for closing the switch contacts below a predetermined frequency.

7. An electric power generating unit adapted to supply power to a constant load comprising, a variable speed driving member, an alternator for generating alternating current, an electromagnetic clutch having a driving element operatively connected to said driving member and a driven element operatively connected to said alternator, one of said elements comprising a rotor of magnetic material having a high hysteresis loss and the other of said elements carrying an exciting winding, a D.C. power supply for supplying excitation current to said exciting winding and to said alternator, and automatic control means responsive to the frequency of the voltage generated by said alternator for varying the excitation current to the clutch winding over a range in which the torque output of said clutch is substantially independent of the slip, whereby the alternator may be accelerated and decelerated about a predetermined speed corresponding to a desired frequency.

8. In combination, a variable speed prime mover having a driven shaft, an electromagnetic clutch having a driving element and a driven element, an exciting winding for said clutch, power transmission means operatively connecting said clutch driving element to said prime mover driven shaft, a D.C. generator connected for rotation with said clutch driving element, an alternator having a field winding and an armature, power transmission means operatively connecting said alternator to said clutch driven element, a substantially constant D.C. voltage power supply independent of said prime mover for exciting said clutch winding and said alternator field winding, and relay control means supplied from said D.C. generator for controlling the excitation supplied to said clutch winding and to said alternator field from said D.C. voltage power supply.

References Cited in the file of this patent
UNITED STATES PATENTS

| | | |
|---|---|---|
| 2,571,762 | Rich et al. | Oct. 16, 1951 |
| 2,583,523 | Winther | Jan. 22, 1952 |
| 2,605,651 | Winther | Aug. 5, 1952 |
| 2,641,736 | Jaeschke | June 9, 1953 |

FOREIGN PATENTS

| | | |
|---|---|---|
| 466,978 | France | May 29, 1914 |